(12) United States Patent
Igarashi et al.

(10) Patent No.: US 8,677,094 B2
(45) Date of Patent: Mar. 18, 2014

(54) STORAGE SYSTEM, RELEASE METHOD, AND SECONDARY STORAGE APPARATUS

(75) Inventors: Yoshinori Igarashi, Odawara (JP); Hidenori Suzuki, Atami (JP)

(73) Assignee: Hitachi Ltd., Tokyo (JP)

( * ) Notice: Subject to any disclaimer, the term of this patent is extended or adjusted under 35 U.S.C. 154(b) by 933 days.

(21) Appl. No.: 12/081,737

(22) Filed: Apr. 21, 2008

(65) Prior Publication Data
US 2009/0204786 A1 Aug. 13, 2009

(30) Foreign Application Priority Data

Feb. 8, 2008 (JP) ................................. 2008-029233

(51) Int. Cl.
| | |
|---|---|
| G06F 12/00 | (2006.01) |
| G06F 13/00 | (2006.01) |
| G06F 13/28 | (2006.01) |

(52) U.S. Cl.
USPC .......................................... 711/170; 711/114

(58) Field of Classification Search
None
See application file for complete search history.

(56) References Cited

U.S. PATENT DOCUMENTS

| | | | |
|---|---|---|---|
| 6,405,284 B1 * | 6/2002 | Bridge | 711/114 |
| 2004/0068637 A1 | 4/2004 | Nelson et al. | |
| 2004/0193795 A1 | 9/2004 | Takeda et al. | |
| 2005/0027938 A1 * | 2/2005 | Burkey | 711/114 |
| 2005/0091455 A1 | 4/2005 | Kano et al. | |
| 2007/0198790 A1 | 8/2007 | Asano et al. | |
| 2007/0245114 A1 | 10/2007 | Kakui et al. | |

FOREIGN PATENT DOCUMENTS

| | | |
|---|---|---|
| EP | 1 760 577 A1 | 3/2007 |
| JP | 2003-15915 | 7/2001 |
| JP | 2004-302713 A | 10/2004 |
| JP | 2007-310861 A | 11/2007 |

* cited by examiner

*Primary Examiner* — April Y Blair
*Assistant Examiner* — Gary W Cygiel
(74) *Attorney, Agent, or Firm* — Volpe and Koenig, P.C.

(57) ABSTRACT

The storage system includes page area association information that associates a page area that partitions a storage area in a real volume into predetermined storage areas with a page area that partitions a storage area in a virtual volume into predetermined storage areas; a pair setting unit for pairing a primary virtual volume that stores data from a host computer and a secondary virtual volume to store a copy of the data stored in the primary virtual volume; and a page release unit for releasing association between a page area in the secondary virtual volume and a page area in the secondary real volume associated in advance with the page area in the secondary virtual volume.

9 Claims, 18 Drawing Sheets

FIG.4

| PORT NUMBER | VIRTUAL VOLUME NUMBER | PAIR STATUS | PAGE RELEASE | SECONDARY STORAGE APPARATUS NUMBER | SECONDARY PORT NUMBER | SECONDARY VIRTUAL VOLUME NUMBER | TYPE | CONSISTENCY RATE | ... |
|---|---|---|---|---|---|---|---|---|---|
| 1 | 0000 | SNPL | ☐ | 63507 | 1 | 0000 | | | ... |
| 1 | 0001 | SNPL | ☐ | 63507 | 1 | 0001 | | | ... |
| 1 | 0002 | SNPL | ☐ | 63507 | 1 | 0002 | | | ... |
| 1 | 0003 | COPY | ☑ | 63507 | 1 | 0003 | SYNCHRONOUS | 56 | ... |
| 1 | 0004 | PAIR | ☐ | 63507 | 1 | 0004 | SYNCHRONOUS | 100 | ... |
| ... | ... | ... | ... | ... | ... | ... | ... | ... | ... |

VIRTUAL VOLUME TABLE 720

FIG.5

| VIRTUAL VOLUME NUMBER | VIRTUAL PAGE NUMBER | REAL VOLUME NUMBER | REAL PAGE NUMBER | HARD DISK NUMBER |
|---|---|---|---|---|
| 1 | 23 | 6 | 23 | 1 |
| 1 | 26 | 6 | 26 | 1 |
| 1 | 40 | 7 | 10 | 3 |
| 1 | 56 | 7 | 26 | 4 |
| ... | ... | ... | ... | ... |

7210   7211   7212   7213   7214

VOLUME MANAGEMENT TABLE 721

PAGE INITIALIZATION TABLE 722

PAGE AVAILABILITY TABLE 723

STORAGE SYSTEM, RELEASE METHOD, AND SECONDARY STORAGE APPARATUS

CROSS-REFERENCES TO RELATED APPLICATIONS

This application relates to and claims priority from Japanese Patent Application No. 2008-029233, filed on Feb. 8, 2008, the entire disclosure of which is incorporated herein by reference.

BACKGROUND

1. Field of the Invention

The invention relates to a storage system, a release method, and a secondary storage apparatus. The invention is particularly utilized in storage systems having a storage apparatus in which plural virtual volumes are paired.

2. Description of Related Art

In storage systems in which data is stored using storage apparatuses, there is a conventional method for managing plural hard disks in a RAID (Redundant Array of Independent/Inexpensive Disks) format. At least one logical volume is formed in a physical storage area provided by a number of hard disks.

In recent years, Japanese Patent Laid-Open Publication No. 2003-015915 has disclosed a technique of providing virtual volumes from logical volumes to a host computer, not creating logical volumes with a fixed capacity from a storage area in a hard disk. Storage areas in logical volumes are dynamically allocated to those virtual volumes. With this configuration, storage areas that are in actuality dispersed over plural storage apparatuses can be provided as a single volume to a host computer.

Two of virtual volumes are set as primary and secondary virtual volumes respectively and paired, and data reliability is maintained by copying data from the primary virtual volume to the secondary virtual volume.

If a new pair is set using a secondary virtual volume that has already been used, a method where all data (data including zero data) of the same size as the available capacity in the secondary virtual volume is copied from a relevant primary virtual volume to the secondary virtual volume to make the content of those virtual volumes the same, or a method where the secondary virtual volume is paired with a primary virtual volume after initializing the area that has been used in the secondary virtual volume and only a data storing area in the primary virtual volume is copied to the secondary virtual volume to make the content in those virtual volumes the same has been used.

However, since in the former method the amount of traffic is large, data transfer takes long time. Although in the latter method the traffic is small, a primary virtual volume has to be acquainted with the status of a relevant secondary virtual volume, and data copy has to be stored in a storage area in a secondary virtual volume corresponding to a data storing area in a primary virtual volume.

In addition, when a user pays an amount in proportion to the purchased capacity of both volumes set in a pair, in the case of the former method the user has to pay for not only the capacity necessary for data copy but also the capacity of a storage area that has already been used in a secondary virtual volume. In the case of the latter method, a user has to purchase only the capacity used for data copy, but the user has to initialize and thus reconfigure, by himself, a secondary virtual volume that has already been used for another purpose immediately before setting a pair. In this way, dealing with cost and operation redundancy becomes an issue for a user.

SUMMARY

An object of the invention is to provide a storage system, a release method, and a secondary storage apparatus capable of avoiding user's cost and operation redundancy and efficiently using the capacity that does not have to be used for data copy in a secondary virtual volume.

To achieve the above object, the invention provides a storage system including a storage apparatus that provides a real volume formed by a storage area in plural disks, and a virtual volume that is dynamically provided based on a storage area in the real volume, the storage system comprising: page area association information for associating a page area that partitions a storage area in the real volume into predetermined storage areas with a page area that partitions a storage area in the virtual volume into predetermined storage areas; a pair setting unit for pairing a primary virtual volume that stores data from the host computer and a secondary virtual volume to store a copy of the data; and a page release unit for releasing association between a page area in the secondary virtual volume and a page area in a secondary real volume associated in advance with the page area in the secondary virtual volume.

With that configuration, even if a storage area in the secondary virtual volume is in use when a pair is set, the secondary virtual volume can be initialized by releasing the association between the secondary real volume that stores actual data and the secondary virtual volume.

The invention also provides a release method for a storage system including a storage apparatus that provides a real volume formed by a storage area in plural disks, and a virtual volume that is dynamically provided based on a storage area in the real volume, the method comprising: a management step of associating a page area that partitions a storage area in the real volume into predetermined storage areas with a page area that partitions a storage area in the virtual volume into predetermined storage areas and managing information about that association as page area association information; a pair setting step of pairing a primary virtual volume that stores data from the host computer and a secondary virtual volume to store a copy of the data; and a page release step of releasing association between a page area in the secondary virtual volume and a page area in a secondary real volume associated in advance with the page area in the secondary virtual volume.

With that configuration, even if a storage area in the secondary virtual volume has already been used when a pair is set, the secondary virtual volume can be initialized by releasing the association between the secondary real volume that actually stores data and the secondary virtual volume.

The invention also provides a secondary storage apparatus connected to a primary storage apparatus having a primary virtual volume for storing data from a host computer, that provides a secondary real volume formed by a storage area of plural disks and a secondary virtual volume dynamically provided based on a storage area in the real volume, the secondary storage apparatus comprising: page area association information that associates a page area that partitions a storage area in the secondary real volume into predetermined storage areas with a page area that partitions a storage area in the secondary virtual volume into predetermined storage areas; a pair setting unit for pairing the primary virtual volume with the secondary virtual volume to store copy of data in the primary virtual volume; and a page release unit for releasing association between a page area in the secondary virtual volume and a page area in the secondary real volume associated in advance with the page area in the secondary virtual volume.

With that configuration, even if a storage area in the secondary virtual volume is in use when a pair is set, the secondary virtual volume can be initialized by releasing the association between the secondary real volume that actually stores data and the secondary virtual volume.

With the invention, user's cost and operation redundancy are avoided, and the newly-redundant capacity in a secondary virtual volume can effectively be utilized.

Other aspects and advantages of the invention will be apparent from the following description and the appended claims.

BRIEF DESCRIPTION OF THE DRAWINGS

FIG. 4 is a diagram showing a virtual volume table in an embodiment of the invention.

FIG. 5 is a diagram showing a volume management table in an embodiment of the invention.

DETAILED DESCRIPTION OF PREFERRED EMBODIMENTS

An embodiment of the invention will be described below with reference to the drawings.

1. Storage System Configuration

Figure 1:
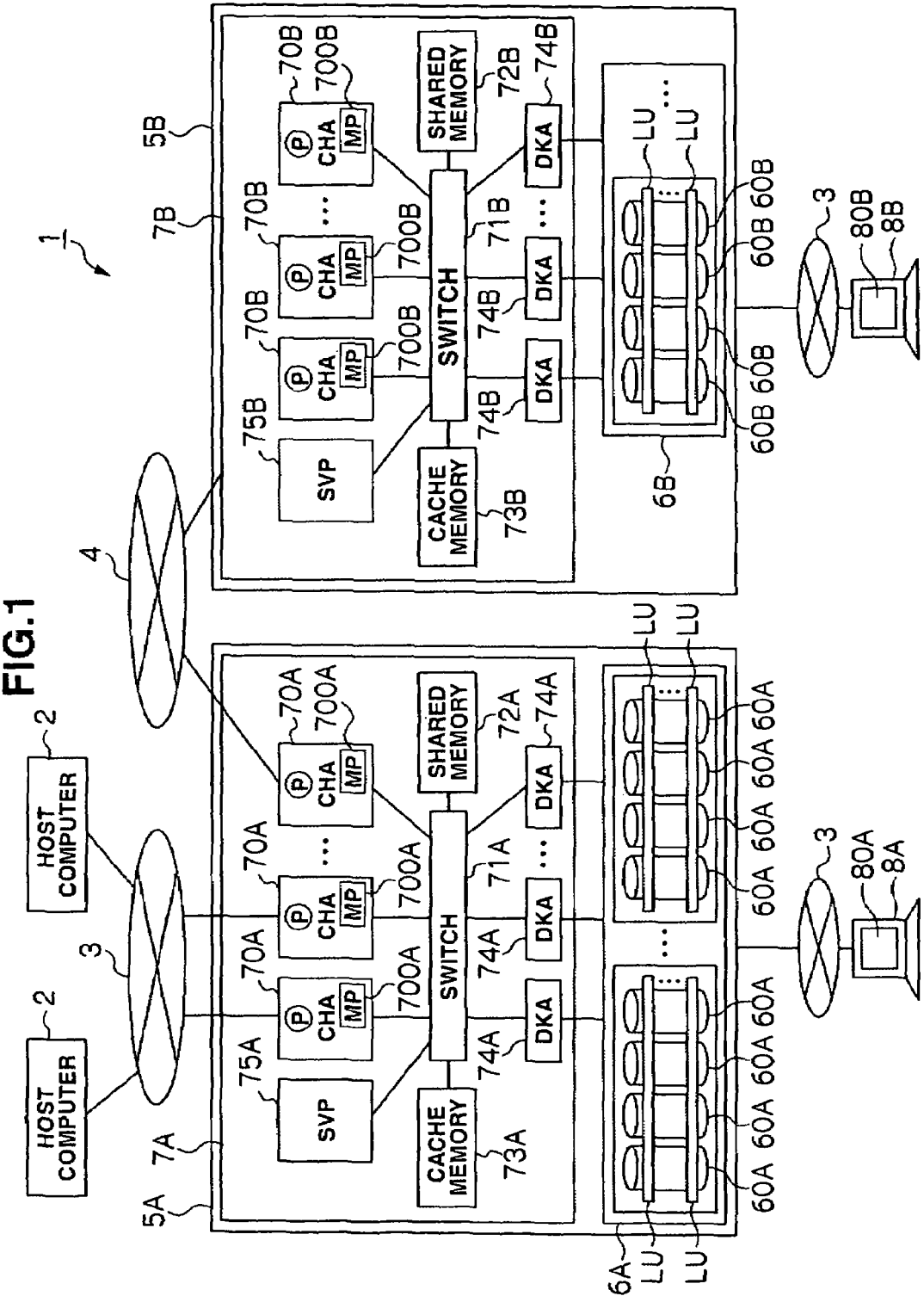
FIG. 1 is a block diagram showing a hardware configuration for a storage system in an embodiment of the invention.

Referring to FIG. 1, numerical reference 1 represents an overall storage system in this embodiment. In the storage system 1, a host computer 2 is connected to a primary storage apparatus 5A via a network 3, the primary storage apparatus 5A is connected to a secondary storage apparatus 5B via a data copy network 4, and each storage apparatus is connected to a storage navigator 8 via a network 3.

In this embodiment, a storage apparatus that inputs/outputs data sent to/from the host computer 2 is referred to as a primary storage apparatus 5A.

The host computer 2 is a computer device equipped with information processing resources such as a CPU and memory, and examples of the host computer 2 include a personal computer, a workstation, and a mainframe. The host computer 2 has information input devices such as a keyboard and a switch (not shown), and information output devices such as a monitor display and a speaker (not shown).

Examples of the network 3 and the data copy network 4 include a SAN (Storage Area Network), a LAN (Local Area Network), the Internet, a public line, or a dedicated line. If the network 3 is a SAN, data is communicated according to Fibre Channel protocol. If the network 3 is a LAN, data is communicated according to TCP/IP protocol. In this embodiment, the network 3 for connecting the host computer 2 with the primary storage apparatus 5A is a SAN, and the other networks 3 and the data copy network 4 are LANs.

The storage apparatus 5 has a disk unit 6 including plural hard disks 60 (HDD) and a controller unit 7 for managing the hard disks 60 using RAID format. The suffixes "A" and "B" are omitted, except where the storage apparatuses have to be distinguished.

The hard disks 60 are expensive, high-performance disks such as SCSI disks, or inexpensive, low-performance disks such as SATA disks or optical disks.

The controller unit 7 includes channel adapters 70 (CHA), a switch 71, shared memory 72, cache memory 73, plural disk adapters 74 (DKA), and a service processor 75 (SVP).

Each channel adapter 70 is a microcomputer system including a microprocessor 700, memory (not shown), and a communication interface, and is provided with a port P for connecting to a network. Each channel adapter 70 interprets various commands sent from the host computer 2 and executes required processing. A network address (such as an IP address or WWN) for identifying each port P in the channel adapters 70 is allocated to the port P. With the network address, each channel adapter 70 can individually serve as a NAS (Network Attached Storage).

The switch 71 is connected to the channel adapters 70, the shared memory 72, the cache memory 73, and the disk adapter 74. Data and commands are exchanged, via the switch 71, between the channel adapter 70, the shared memory 72, the cache memory 73, and the disk adapters 74.

The shared memory 72 is memory shared by the channel adapters 70 and the disk adapters 74. The shared memory 72 is used mainly for storing system configuration information, various programs, and commands or similar sent from the host computer 2. Various tables and programs stored in the shared memory 72 will be described later.

The cache memory 73 is also memory shared by the channel adapters 70 and the disk adapters 74. The cache memory 73 is used mainly for temporarily storing data input to/output from the storage apparatuses.

The disk adapter 74 is a microcomputer system including a microprocessor 700 (not shown) and memory (not shown) or similar, and functions as an interface for controlling protocols used during communication with the disk unit 6. Each disk adapter 74 is connected to a relevant disk unit 6 via, for example, Fibre Channel cable, and exchanges data with that disc unit in accordance with Fibre Channel protocol.

The service processor 75 is a computer device for maintaining the storage apparatuses 5, and examples of the service processor 75 include a personal notebook computer. The service processor 75 is connected to the host computer 2 via the network 3, and is able to receive data or commands from the host computer 2.

The storage navigator 8 is a computer device for managing the storage apparatuses 4, and examples of the storage navigator 8 include a personal computer. The storage navigator 8 sets storage apparatuses to be paired from among the plural storage apparatuses, sets a pair of virtual volumes V described later, or manages association between a virtual volume V and a logical volume, which will also be described later. The storage navigator 8 may display the setting and management on a management screen 80.

In the storage system 1 in this embodiment, four disks in the hard disks 60 form a single RAID group. One or more logical volume(s) LU are defined in a storage area provided by the single RAID group.

A specific identifier LUN (Logical Block Number) is allocated to each logical volume LU. Data is input or output by specifying an address, which is a combination of the identifier and a specific number LBA (Logical Block Address) assigned to each block, which is a logical division of a logical volume.

(2) Logical Configuration for Hard Disks

Figure 2:
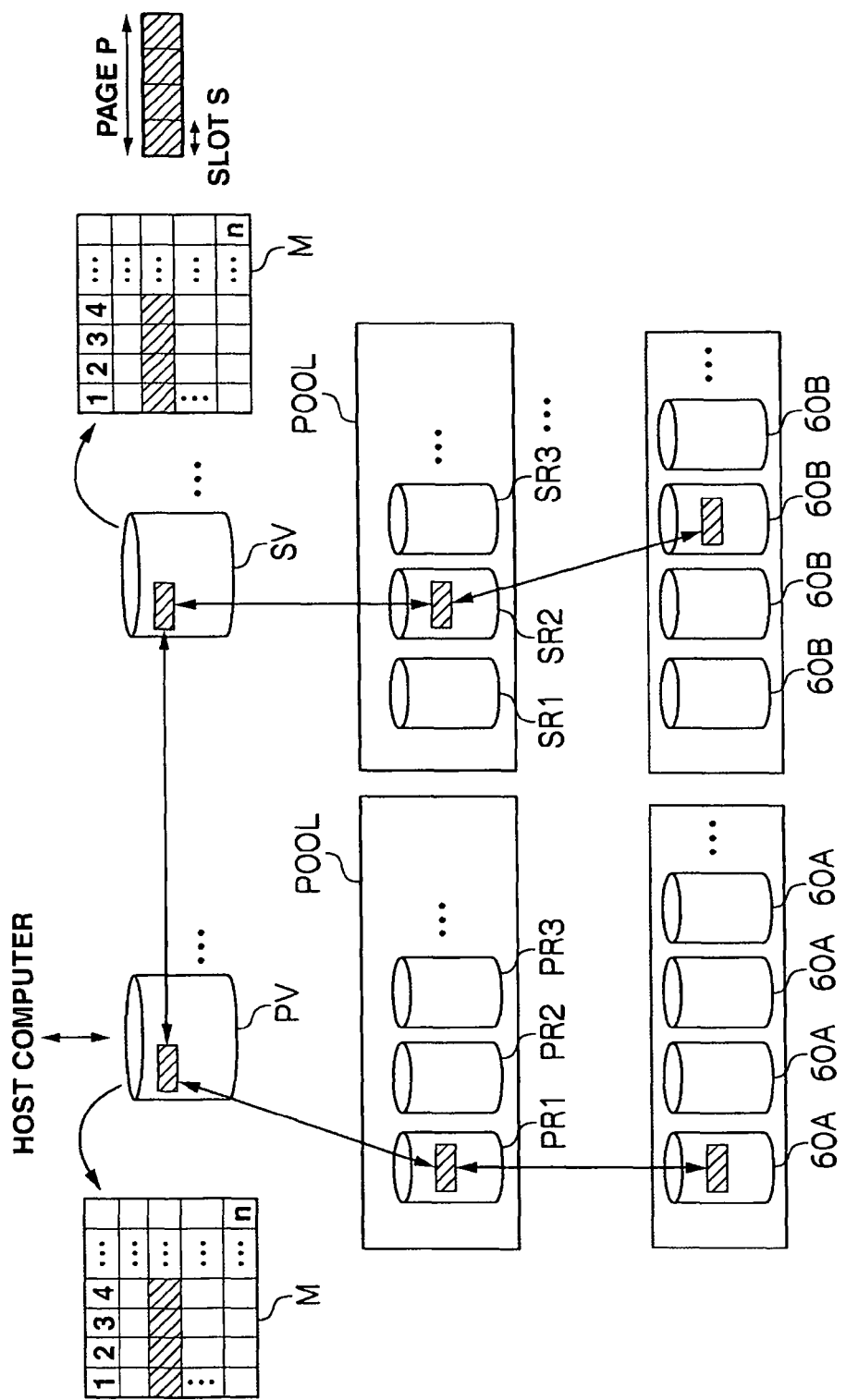
FIG. 2 is a conceptual diagram illustrating logical volumes in an embodiment of the invention.

FIG. 2 is a conceptual diagram showing a logical configuration for the hard disks 60 in the storage system 1.

The logical volumes LU include virtual volumes V, which are logical volumes accessed by the host computer 2, and real volumes R, which are associated with those virtual volumes V. Each storage area in the real volumes R is associated with a real storage area in the hard disks 60. A pool area POOL is formed by plural real volumes R.

Storage areas are provided to the virtual volumes V by dynamically allocating, to the virtual volumes V, storage areas in the hard disks 60 associated with the real volumes R in the pool area POOL. The virtual volumes V may virtually create a volume capacity to provide the host computer 2 with volumes having an arbitrary capacity that does not depend on the physical capacity.

A storage area in each virtual volume V is partitioned by a storage area referred to as a "slot S." A slot S is a minimum storage area where the above mentioned data is stored, and corresponds to a block. FIG. 2 shows a bitmap M where the status of storage areas in the virtual volumes V is reflected. The bitmap M is partitioned in units of slots.

The virtual volumes V and the real volumes R are associated with each other in units of minimum storage areas referred to as "page(s) P." A single page P is formed by several slots S, which partition the storage area in the page P.

In this embodiment, pairs can be set between virtual volumes V recognized by the host computer 2. A virtual volume V the host computer 2 directly accesses is referred to as a primary virtual volume PV, and a copy destination virtual volume V that stores a copy of data stored in the primary virtual volume PV (or, in actuality, data stored in a storage area in a hard disk drive 60 allocated to a primary virtual volume PV) is referred to as a secondary virtual volume SV.

A real volume allocated to a primary virtual volume PV is referred to as a primary real volume PR, and a real volume allocated to a secondary virtual volume SV is referred to as a secondary real volume SR.

In the following description, the virtual volumes and real volumes are referred to as the "virtual volumes V" and "real volumes V" respectively, except where the primary and secondary have to be distinguished.

(3) Table Configuration

Figure 3:
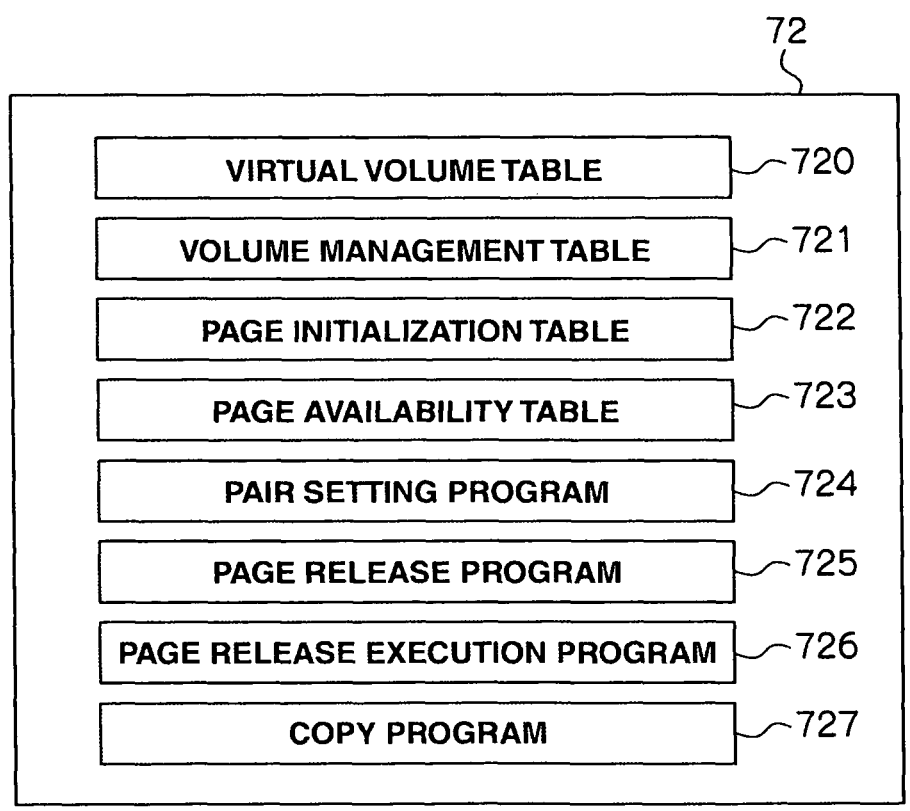
FIG. 3 is a block diagram showing the content of shared memory in an embodiment of the invention.

FIG. 3 shows an example of various tables and programs stored in the shared memory 72.

The shared memory 72 stores a virtual volume table 720, a volume management table 721, a page initialization table 722, a page availability table 723, a pair setting program 724, a page release program 725, a page release execution program 726, and a copy program 727.

(3-1) Virtual Volume Table

The virtual volume table 720 is a table held for each port number, and is designed to manage information on all virtual volumes V the storage apparatuses 5 can recognize. This table is used when a pair of virtual volumes V is set.

As shown in FIG. 4, the virtual volume table 720 includes: "port number" entries 7200; "virtual volume number" entries 7201 indicating the primary virtual volume PV numbers; "pair status" entries 7202 indicating whether each primary virtual volume PV is in a paired state; "page release" entries 7203 indicating whether to release pages P in each secondary virtual volume SV; "secondary storage apparatus number" entries 7204 indicating secondary storage apparatus 5B numbers; "secondary port number" entries 7205 indicating port numbers in secondary storage apparatuses; "secondary virtual volume number" entries 7206 indicating secondary virtual volume SV numbers; "type" entries 7207 indicating whether copying conducted between paired virtual volumes PV and SV is synchronous or asynchronous; and "consistency rate" entries 7208 indicating the percentages for data consistency between paired virtual volumes PV and SV.

For example, the pair status "SNPL" means a pair has been set but data has not yet been copied, the pair status "COPY" means that data is being copied, and the pair status "PAIR" means that data copy has already been finished.

If a "page release" entry 7203 is checked, a relevant page P in a secondary virtual volume SV is automatically released during data copy. The "release" of a page P means that pages (storage area) in a virtual volume V and a real volume R that have been associated with each other is released to delete those virtual volumes V, or more specifically, data stored in a page (storage area) in a real volume R is erased so that new data can be stored in that page (storage area).

(3-2) Volume Management Table

The volume management table 721 is a table held for each storage apparatus 5, and manages association between virtual volumes V and real volumes R.

As shown in FIG. 5, the volume management table 721 includes: "virtual volume number" entries 7210 indicating virtual volume numbers; "virtual page number" entries 7211 indicating storage areas in virtual volumes V; "real volume number" entries 7212 indicating virtual volume numbers; "actual page number" entries 7213 indicating actual page numbers associated with slot numbers of virtual volumes V; and "hard disk number" entries 7214 indicating hard disk numbers associated with real volumes R.

(3-3) Page Initialization Table

The page initialization table 722 is a table for managing, in units of pages, storage areas storing erasure target data in real volumes R. In this embodiment, since storage areas to be initialized by page release are those in the secondary virtual volumes SV, it is particularly necessary for this table 722 to be stored in the shared memory 72 in the secondary storage apparatus 5B.

Figure 6:
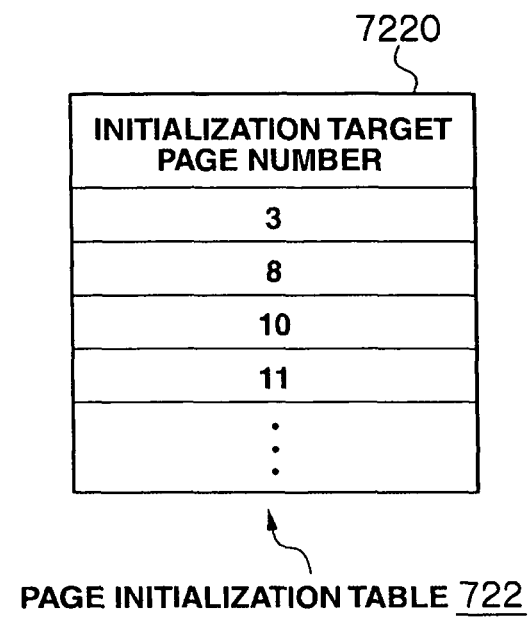
FIG. 6 is a diagram showing a page initialization table in an embodiment of the invention.

As shown in FIG. 6, the page initialization table 722 includes "initialization target page number" entries 7220 indicating page numbers of initialization target storage areas.

(3-4) Page Availability Table

The page availability table 723 is a table for managing, in units of pages, storage areas, in all storage areas in real volumes R, capable of storing data.

Figure 7:
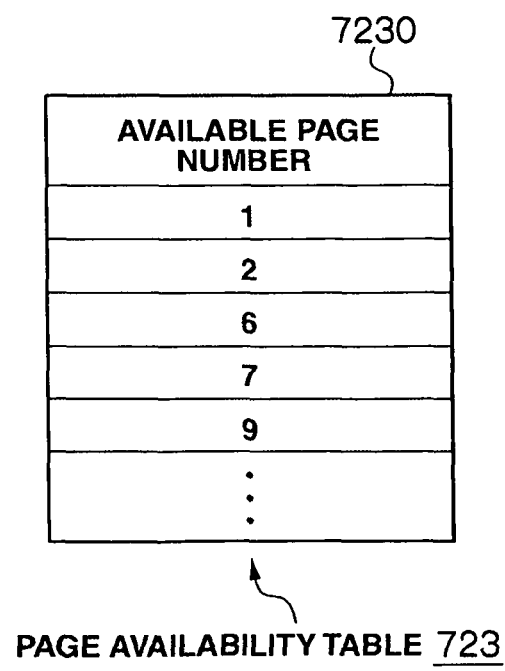
FIG. 7 is a diagram showing a page availability table in an embodiment of the invention.

As shown in FIG. 7, the page availability table 723 includes "available page number" entries 7230 indicating page numbers of storage areas capable of storing data.

(4) Each Type of Processing

Figure 8:
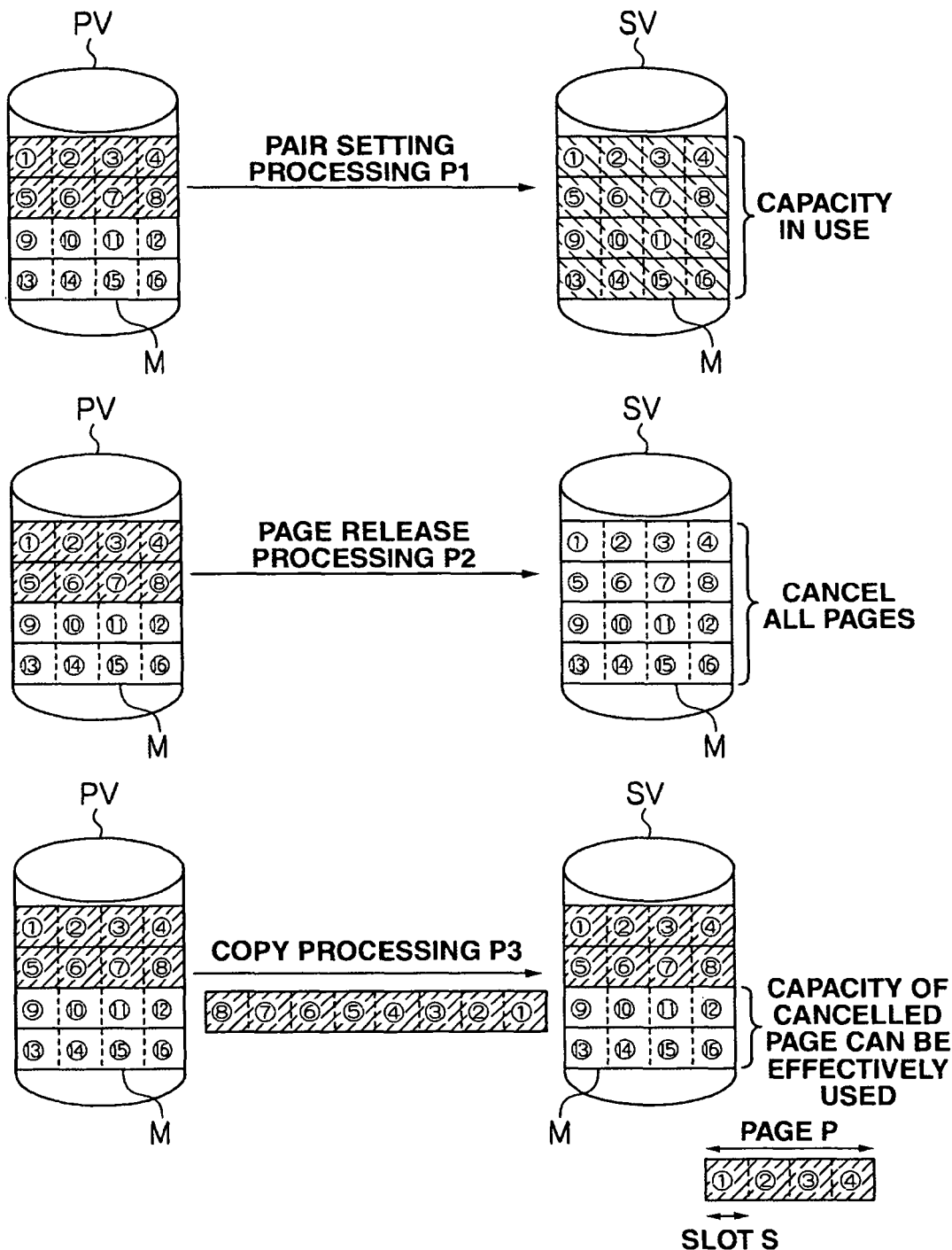
FIG. 8 is a diagram illustrating each type of processing in an embodiment of the invention.

In this embodiment, as shown in FIG. 8, processing P1 for setting a virtual volume pair (hereinafter referred to as "pair setting processing P1"), processing P2 for releasing a page ("page release processing P2"), and processing P3 for copying data ("copy processing P3") can be sequentially executed on primary and secondary virtual volumes PV and SV. Each type of processing will be described below.

(4-1) Pair Setting Processing

Processing for pairing virtual volumes V using the above described tables will be described. The pair setting processing is executed by an administrator via the management screen 80 in the storage navigator 8A that manages the primary storage apparatus 5A. The administrator performs operation from the management screen in the storage navigator 8A, then a CPU in the storage navigator 8A calls the pair setting program 724 to execute the pair setting processing P1.

Figure 9:
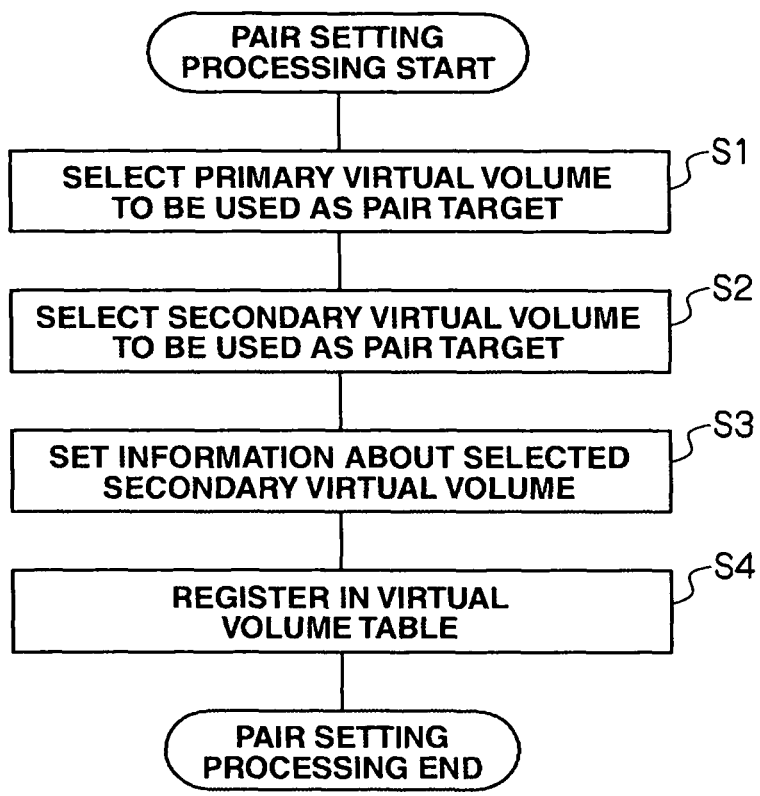
FIG. 9 is a flowchart showing processing for setting a pair.
Figure 10:
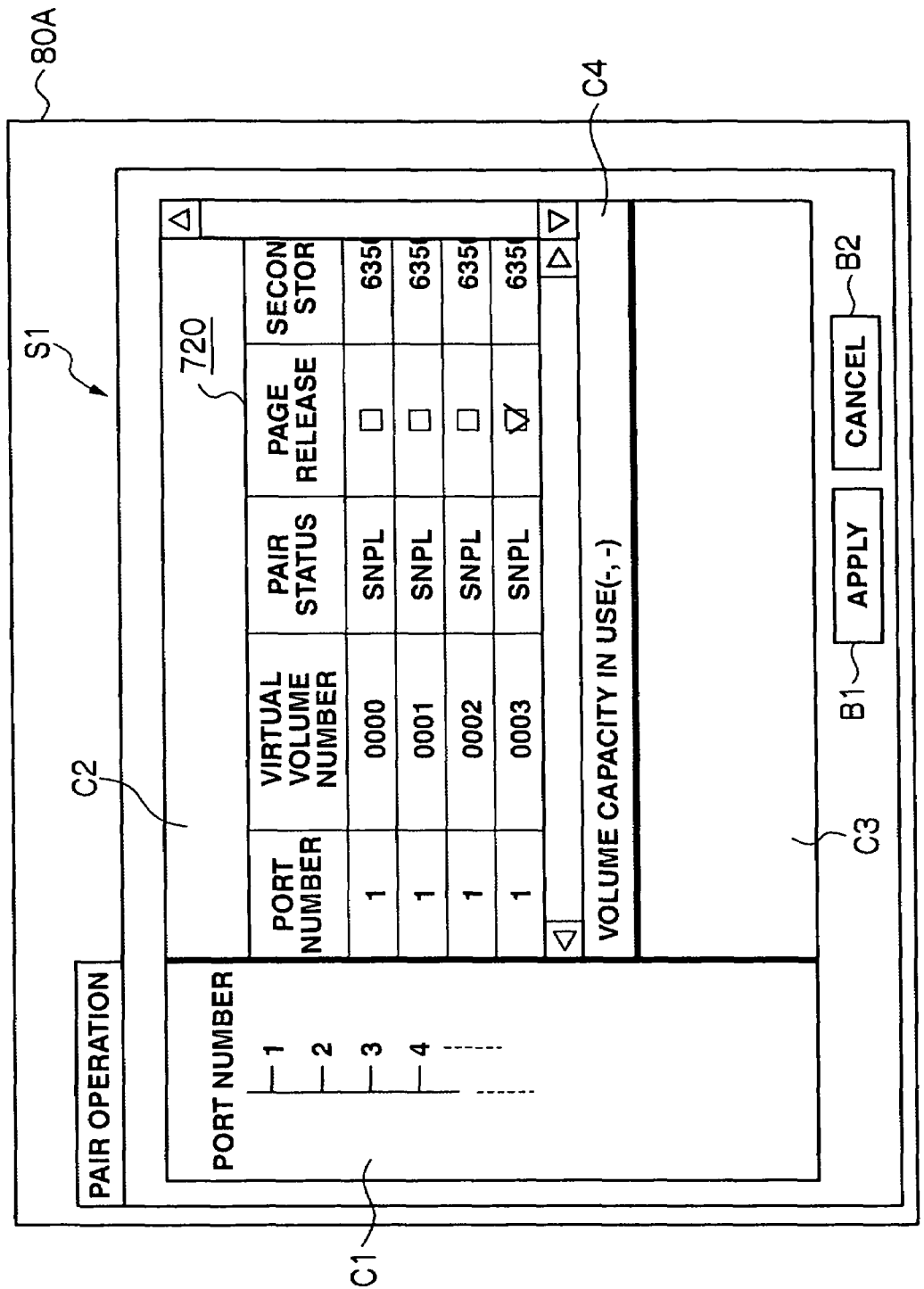
FIG. 10 is a diagram showing a pair setting screen in an embodiment of the invention.

First, as shown in FIG. 9, an administrator selects a primary virtual volume PV the administrator wants to use for pair setting (S1). More particularly, as shown in FIG. 10, a pair operation screen S1 is output on the management screen 80A in the storage navigator 8A. The port numbers of the primary storage apparatus 5A are shown in a tree structure on a section C1 in the left of the screen. If one of the port numbers is selected, a list of the virtual volumes connected to the selected port number is output as a virtual volume table 720 on a right section C2 in the screen. The administrator selects an arbitrary virtual volume V from the virtual volume table 720.

To set the above selected virtual volume V as the primary virtual volume PV, the administrator presses an "APPLY" button B1 in the lower right of the screen. Meanwhile, when releasing the pair operation, the administrator presses a "CANCEL" button B2.

Information about a secondary virtual volume SV selected for pair setting is output in a lower right section C3 of the screen. At this moment, no pair is set, so no information is output at the lower right section C3 of the screen. A central section C4 in the screen also indicates information about a secondary virtual volume SV, and will be explained later.

Figure 11:
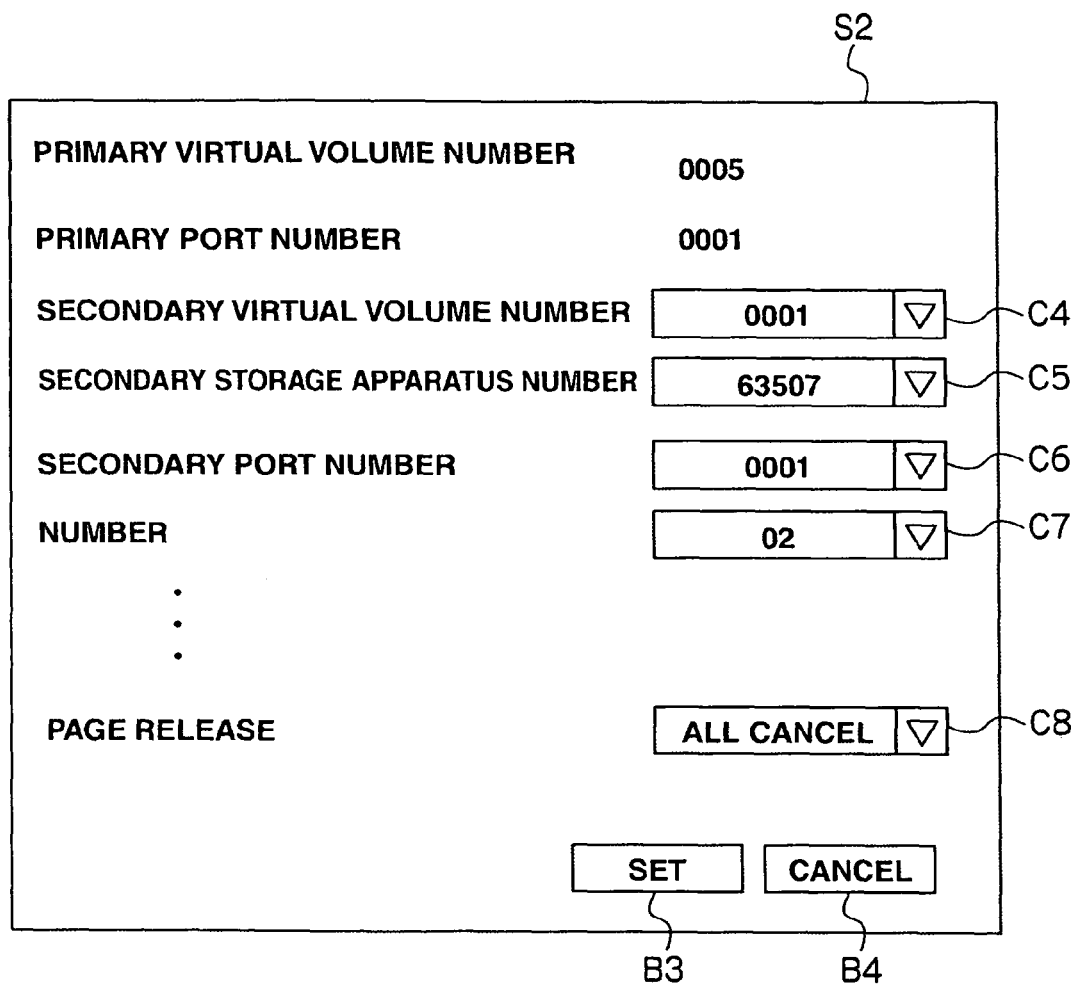
FIG. 11 is a diagram showing a pair setting screen in an embodiment of the invention.

After the administrator presses the "APPLY" button B1, a setting screen S2 shown in FIG. 11 is output on the management screen 80A, and the administrator selects a secondary virtual volume SV (S2). The primary virtual volume PV number selected in step S1 and its port number are shown in the setting screen S2, so the administrator selects information, such as a secondary virtual volume SV number, about the secondary virtual volume SV the administrator wants to pair with that primary virtual volume PV.

The administrator can select an arbitrary secondary virtual volume SV by pulling down a secondary virtual volume SV number entry C4. Likewise, the administrator can also select an arbitrary secondary storage apparatus 5B from a secondary storage apparatus number entry C5; select, from a secondary port number entry C6, a secondary port P to be used; and select, from a number entry C7, the number of secondary virtual volumes SV to be created.

The administrator can also select, from a page release entry C8, whether or not to release pages in a secondary virtual volume SV. By pulling down the page release column C8, the administrator can select whether or not to release all pages P currently allocated to the secondary virtual volume SV used for pair setting.

For example, the administrator selects, as information on a secondary virtual volume SV, the secondary virtual volume number "0001," the secondary storage apparatus number "63507," the secondary port P number "0001," the number "02," and "all release" the page P.

When setting the thus selected secondary information, the administrator presses a "SET" button B3 at the lower right of the screen S2. Meanwhile, when releasing the secondary information, the administrator presses a "CANCEL" button B4 at the lower right in the screen S2.

Figure 12:
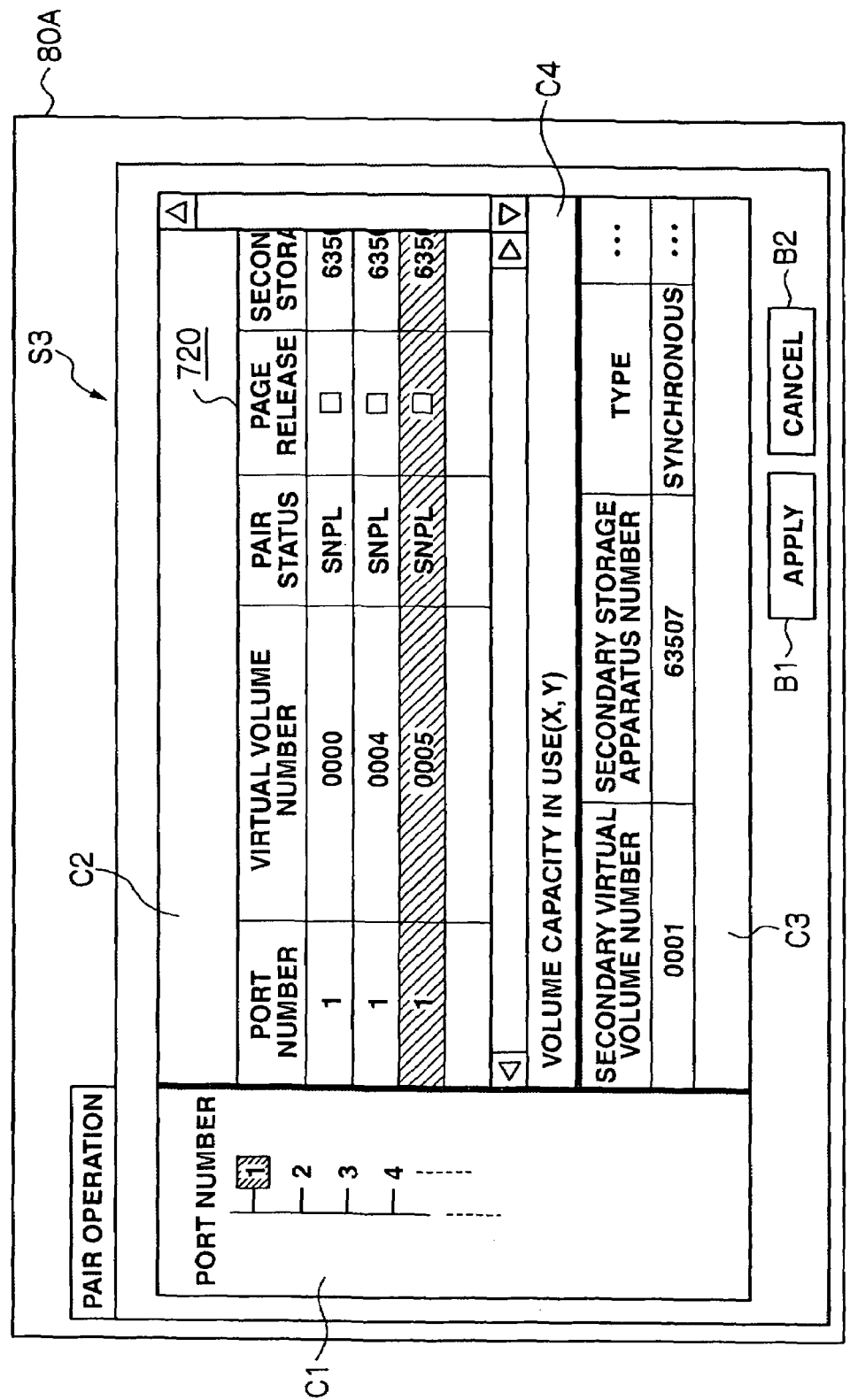
FIG. 12 is a diagram showing a pair setting screen in an embodiment of the invention.

After the administrator presses the "SET" button B3, the information about the secondary virtual volume SV is set (S3). As shown in the pair operation screen S3 in FIG. 12, information about the secondary virtual volume SV selected in step S2 is shown in the form of a table at a lower right section of the screen S3. For example, when a secondary virtual volume SV corresponding to the primary virtual volume PV #0005 is set, information about the secondary virtual volume SV to be paired is shown in the lower right section C3 in the screen S3.

After information about the secondary virtual volume SV shown in a lower right section C3 is selected, the current capacity in use in the secondary virtual volume SV is shown in a central section C4 of the screen. That section shows the capacity X already in use and the entire capacity Y.

Figure 13:
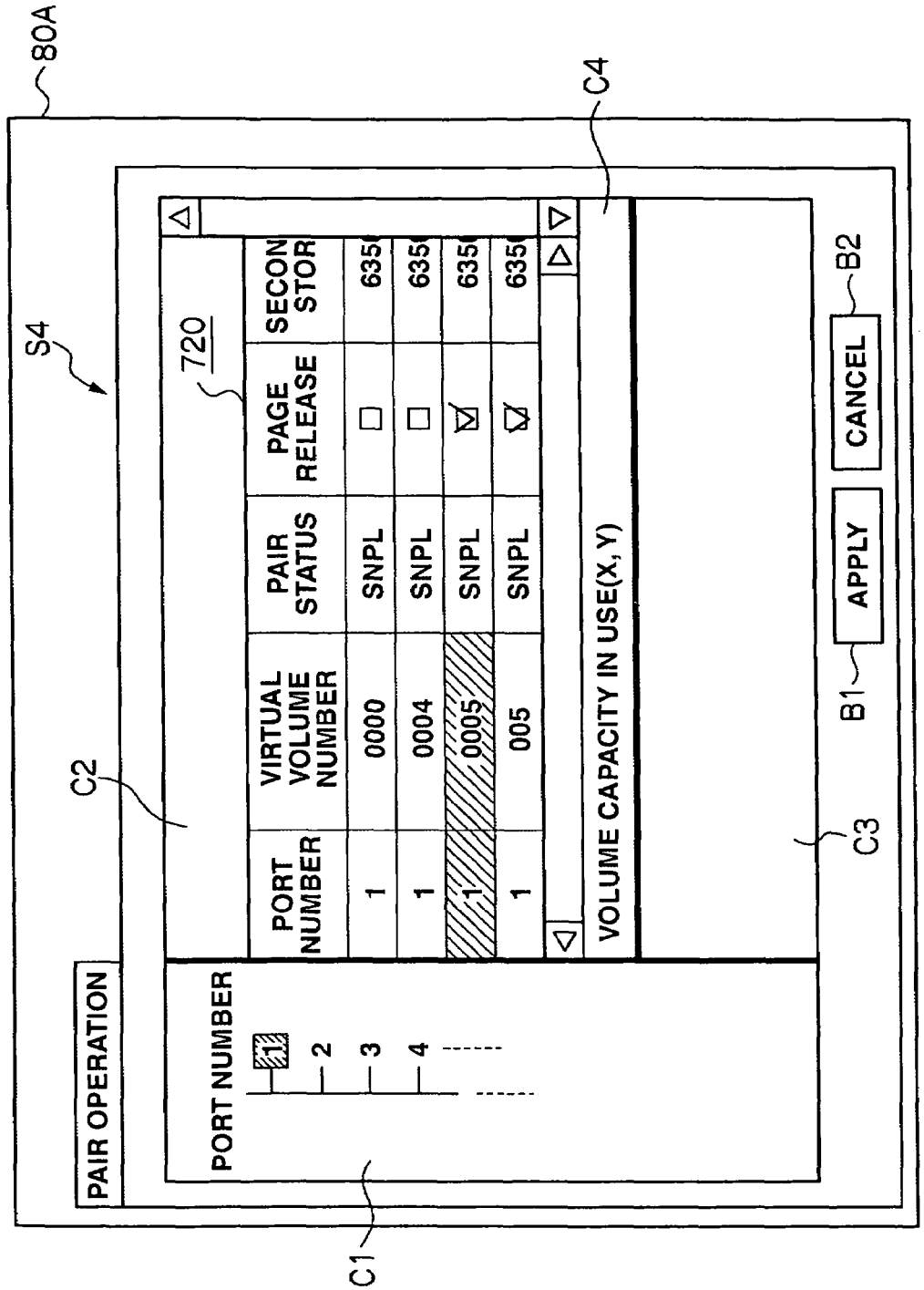
FIG. 13 is a diagram showing a pair setting screen in an embodiment of the invention.

After the administrator presses the "APPLY" button B1, the information about the secondary virtual volume SV output in the lower right section C3 is registered in the virtual volume table 720 (S4). As shown in the pair operation screen S4 in FIG. 13, the registered content is reflected in the lower right section C2 of the screen S4. If, in particular, the administration selects the "all page release" in step S2, the "page release" entry 7203 is checked.

After the registered content is reflected, the pair setting processing P1 ends.

(4-2) Page Release Processing

Next, the page release processing P2 executed on a secondary virtual volume SV before copying data between the paired primary and secondary virtual volumes PV and SV will be described. This processing is executed by the microprocessors 700 in the channel adapters 70 in the primary and secondary storage apparatuses 5 based on the page release program 725 each microprocessor 700 stores. This processing is particularly effective if the storage area in the secondary virtual volume SV is already used by an administrator or a user. The processing is executed in the secondary storage apparatus 5B when a pair is set or when instructed by a user.

First, the administrator orders page release from the management screen 80A in the storage navigator 8A on the primary side, and the page release processing P2 commences after the primary storage apparatus 5A receives the above order.

Figure 14:
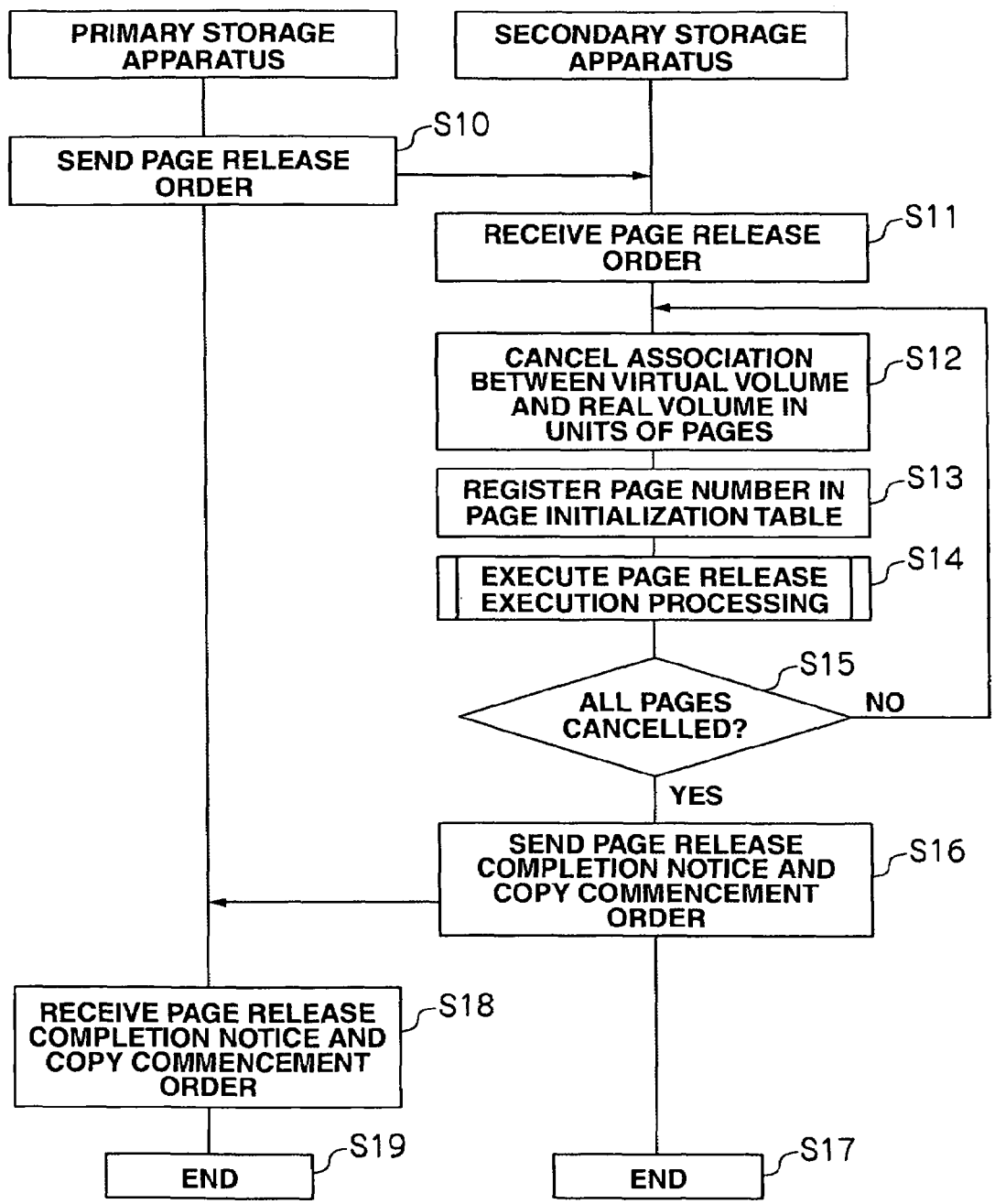
FIG. 14 is a flowchart showing processing for releasing a page in an embodiment of the invention.

Next, as shown in FIG. 14, the primary storage apparatus 5A sends a page release order to the secondary storage apparatus 5B (S10).

After receiving the page release order (S11), the secondary storage apparatus 5B checks the page number for the secondary virtual volume SV targeted in the release order and also checks, in the volume management table 721, the page number for the secondary real volume SR corresponding to the page number targeted in the release order.

The secondary storage apparatus 5B releases the page associated with the secondary virtual volume SV and the secondary real volume SR (S12). After that, the secondary storage apparatus 5B registers, in the page initialization table 722, the page number in the secondary real volume SR for which the association was released (S13).

For example, as shown in FIG. 8, it is assumed that a storage area in the secondary virtual volume SV divided into 16 slots S is an area that has been already used, and that four slots S form a page P. In that case, four portions of the secondary virtual volume SV is associated with a secondary real volume SR based on page units.

Figure 15:
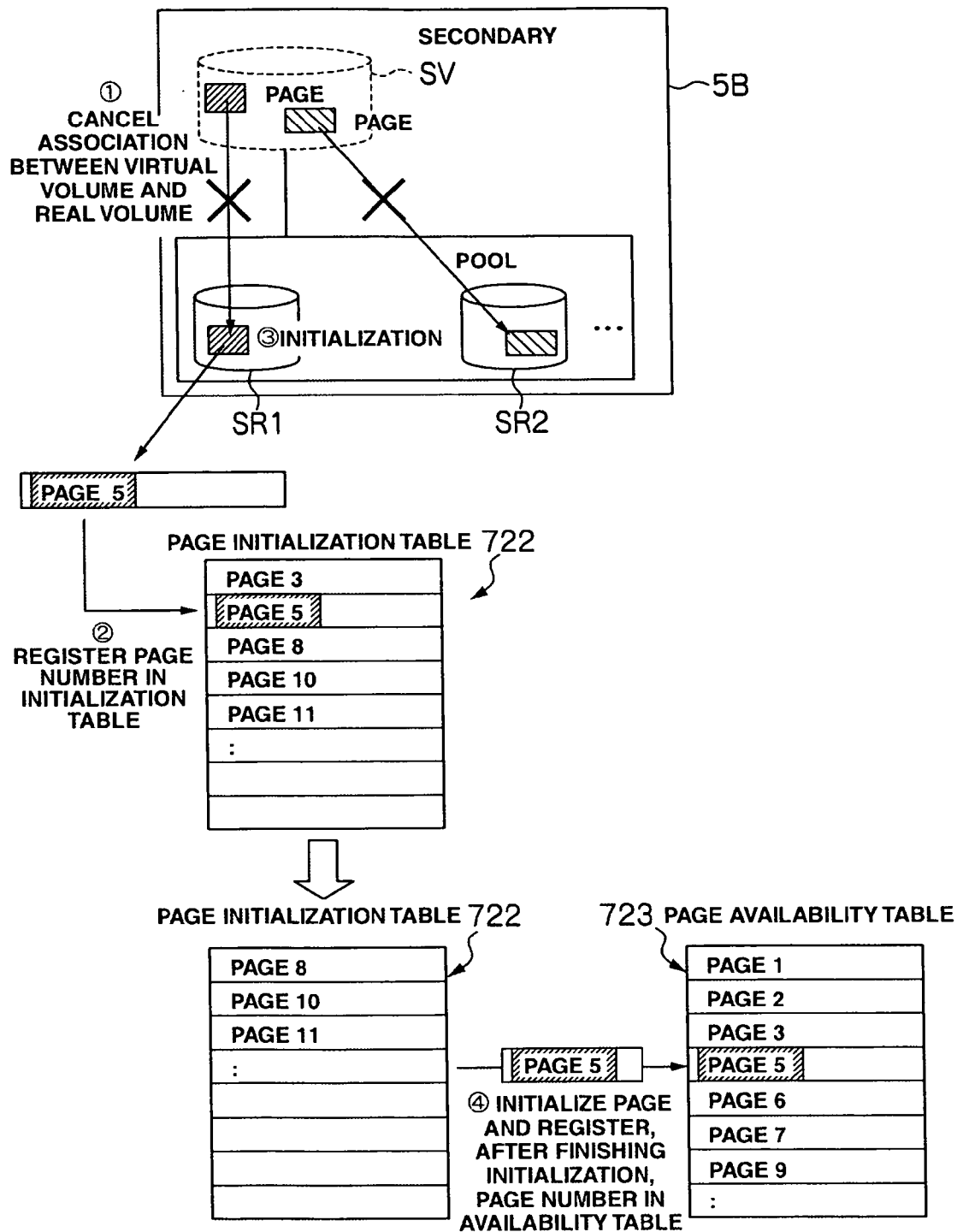
FIG. 15 is a diagram illustrating processing for releasing a page in an embodiment of the invention

FIG. 15 is a conceptual diagram for the page release. The association between secondary virtual volumes SV and secondary real volumes SR is released by executing the page release processing P2. If the page numbers for storage areas in a secondary real volume SR are 5, 8, 10, and 11, those page numbers are registered in the page initialization table 722.

After that, the secondary storage apparatus 5B executes the page release processing on the secondary real volume R and makes the storage area in the secondary real volume R available (S14).

The secondary storage apparatus 5B releases a page P in the secondary real volume SR associated with a page P in the secondary virtual volume SV, and repeatedly executes the page release processing until all page release is finished (S15: NO).

After all page release is finished (S15: YES), the secondary storage apparatus 5B sends, to the primary storage apparatus 5A, a page P release completion notice and an order to commence data copy (S16), and the page release processing in the secondary storage apparatus 5B is finished (S17).

After the primary storage apparatus 5A receives the page release completion notice and the copy commencement order (S18), the page release processing P3 ends (S19).

With the above explained configuration, even if a storage area in the secondary virtual volume SV is already in use when a pair is set, all storage areas in the secondary virtual volume SV can be initialized by the page release processing.

(4-3) Page Release Execution Processing

Processing in step S12 executed in a secondary storage apparatus 5B for executing page release in the secondary virtual volume SV will be described. The page release execution processing is executed by the microprocessors 700B in the channel adapter 70B in the secondary storage apparatus 5B, based on the page release execution program 726.

Figure 16:
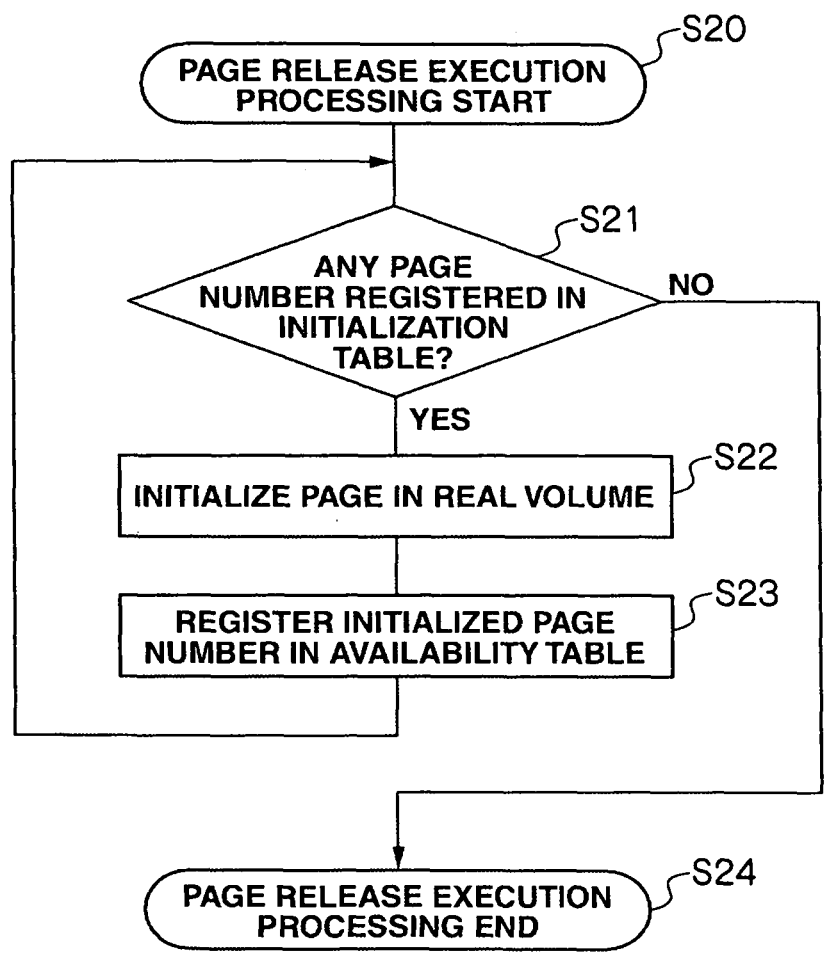
FIG. 16 is a flowchart showing processing for executing page release in an embodiment of the invention.
Figure 17:
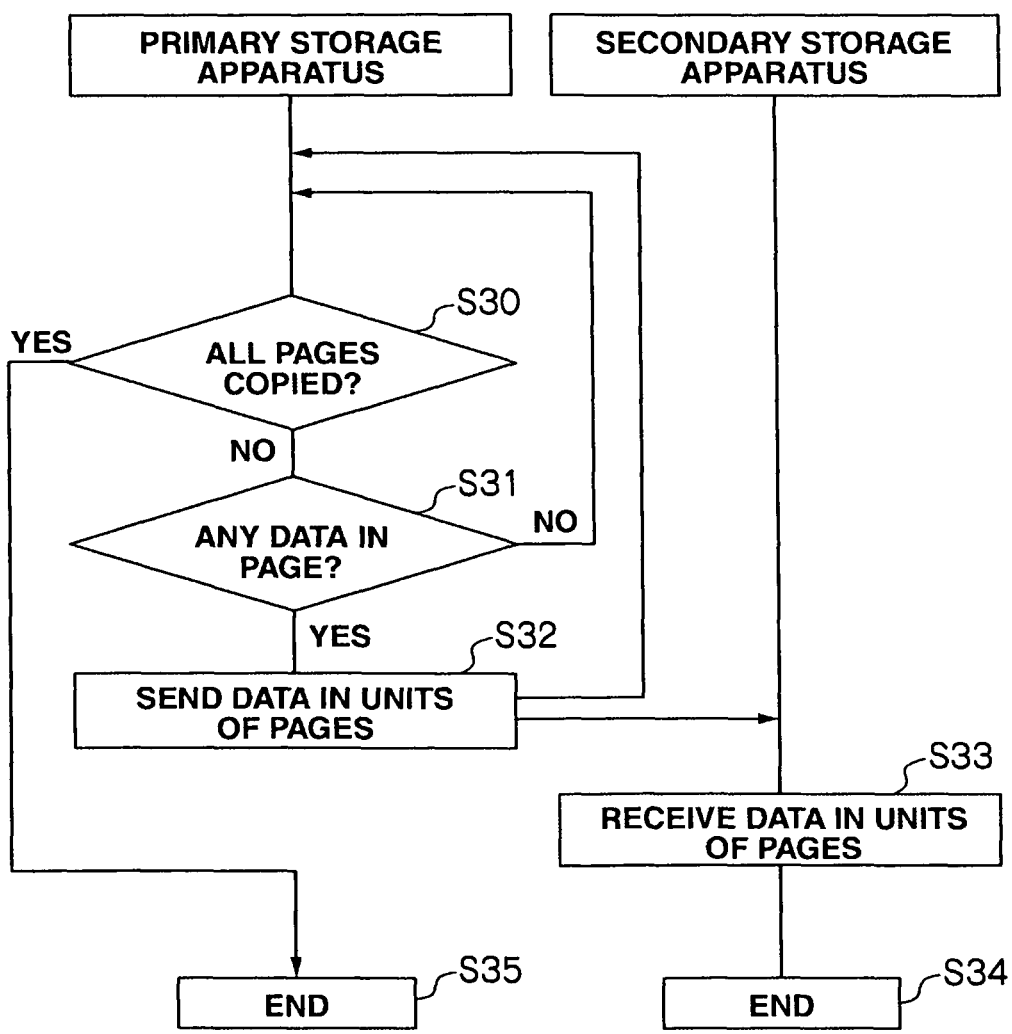
FIG. 17 is a flowchart showing copy processing.

As shown in FIG. 16, a microprocessor 700B commences the page release execution after receiving a page release order (S20).

The microprocessor 700B refers to the page initialization table 722 stored in the shared memory 72B. If a page number is registered in the page initialization table 722 (S21: YES), a storage area corresponding to the registered page number is initialized and data is erased (S22).

After that, the microprocessor 700B registers the above initialized page number in the page availability table 723 (S23).

For example, as shown in FIG. 15, if the initialized page number in the secondary real volume SR is "#5," the microprocessor 700B registers the initialized page P #5 in the page availability table 723.

After the microprocessor 700B repeats processing in steps S21 to S23 until no page number is left in the page initialization table 723 (S21: NO), the page release execution processing ends (S24).

With the above explained configuration, after the page association between a secondary virtual volume SV and a secondary real volume SR is released, a storage area in the secondary real volume SR where data is actually stored is initialized, and that storage area can be made available.

(4-4) Copy Processing

Processing in step S18 executed between the primary and secondary virtual volumes PV and SV after the primary storage apparatus 5A receives the page release completion notice and the copy commencement order will be described. The copy processing P3 is executed based on the copy program 727 by microprocessors 700 in channel adapters 70 in the primary and secondary storage apparatuses 5 that receive an order from an administrator via the management screen 80A.

The primary storage apparatus 5A commences the copy processing P3 after receiving the page release notice and the copy commencement order.

Next, the primary storage apparatus 5A checks whether or not all pages P in the primary virtual volume PV have already been copied to the secondary virtual volume SV (S30). If not all the pages P in the primary virtual volume PV have been copied (S30:NO), the primary storage apparatus 5A checks whether or not data is stored in a check target page (S31).

If data is stored in the check target page P in the primary storage apparatus 5A (S31: YES), data in that page P is sent to a page P in an associated secondary virtual volume SV associated with the check target page P (S32).

The primary storage apparatus 5A repeatedly checks whether or not data is stored in each page (S31: NO). If data is stored (S31: YES), that data is sent to the page P in the secondary virtual volume SV associated with the check target page P (S32).

The secondary storage apparatus 5B has commenced the copy processing P3 when the page P release notice and the copy release completion notice and the copy commencement order is sent to the primary storage apparatus 5A in step S16. Therefore, after the secondary storage apparatus 5B receives the data for each page, that data is stored in an associated page P in the secondary virtual volume SV (S33). More specifically, data is sequentially stored in a page P in a secondary real volume SR associated with a page P in the secondary virtual volume SV. After data copy to all pages P in all secondary virtual volumes SV has finished, the copy processing ends (S34).

If the primary storage apparatus 5A confirms that all pages P have been copied to the secondary virtual volumes SV (S30: YES), the copy processing P3 ends (S35).

For example, it is assumed that, as shown in FIG. 8, slots S1-8, in slots S1-16, in the primary virtual volume PV store data. Only the data stored in slots S1-8 can be copied, by executing the above explained copy processing P3, to corresponding slots S1-8 in the secondary virtual volume SV in units of pages. Accordingly, slots S9-16 in the secondary virtual volume SV can be effectively used as storage areas.

Figure 18:
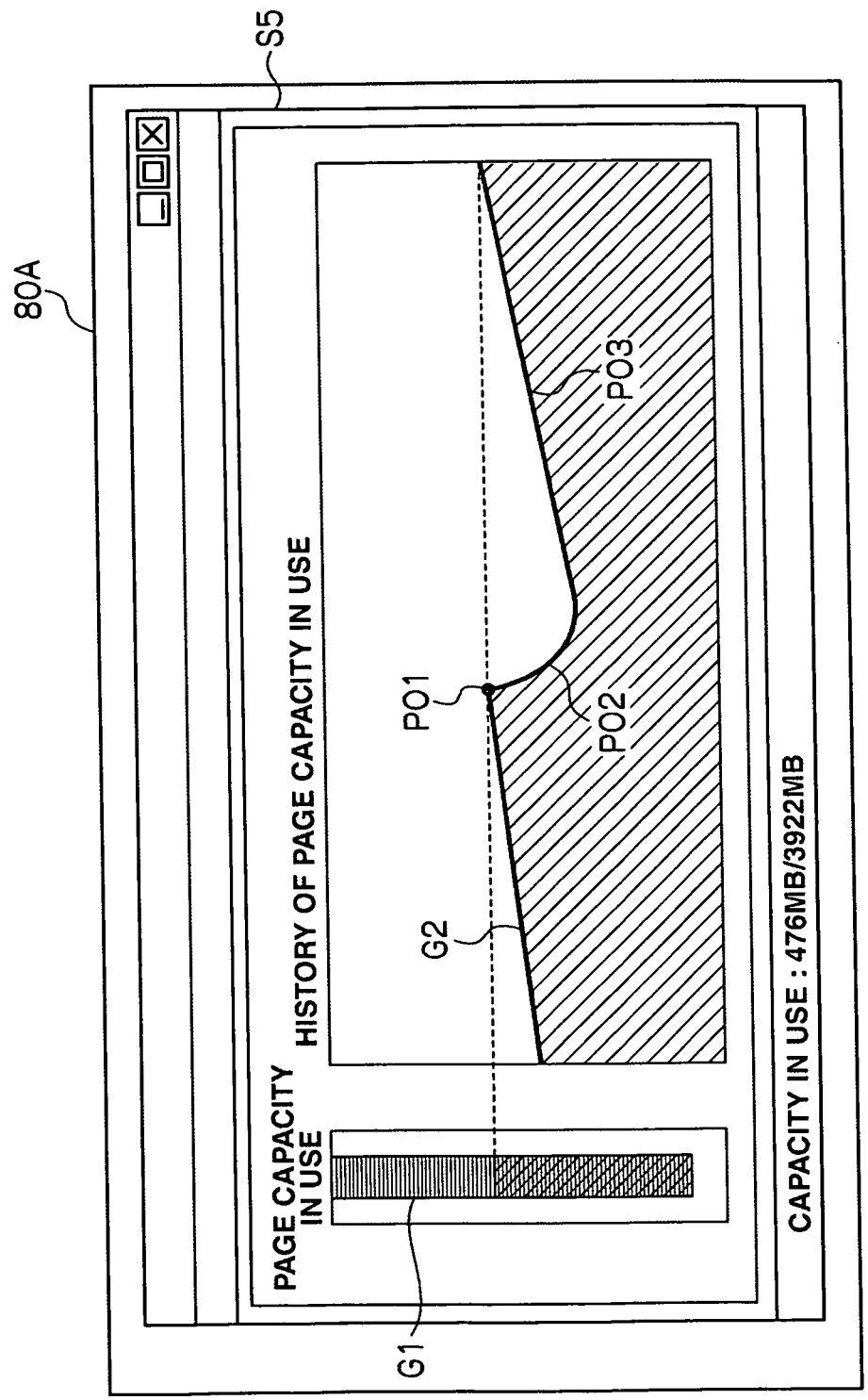
FIG. 18 is a diagram showing a screen for the page capacity in use and history of the page capacity in use in a secondary virtual volume in an embodiment of the invention.

FIG. 18 is a screen S5 where the page capacity in use in a secondary virtual volume SV and the history of the page capacity at an arbitrary point in time in use are output. A bar graph G1 at the left of the screen shows the page capacity in use in a secondary virtual volume SV at an arbitrary point in time. A graph G2 at the right of the screen shows the history of the page capacity in use in the secondary virtual volume SV at an arbitrary point in time. If the page capacity in use is large, it means that there are that many pages (storage areas) associated with the secondary real volume(s) SR From the graph G2, it can be understood that page release commences at point PO1, and the page capacity in use in the secondary virtual volume SV gradually reduces from the point PO2 and increases again from the point PO3. As a result, it can be understood that the storage area in the secondary virtual volume SV that can be effectively used increases from point PO2 to point PO3 because of the page release processing P3.

Figure 19:
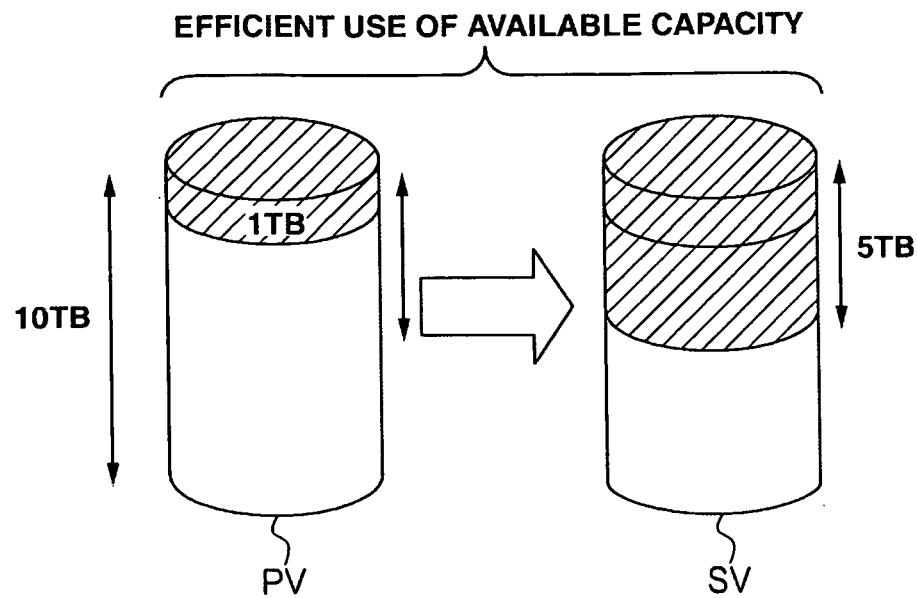
FIG. 19 is a diagram illustrating the conventional available capacity in use in a virtual volume.

Conventionally, as shown in FIG. 19, if 5 TB was used in the secondary virtual volume SV when a pair was just set, even if only 1 TB of data was copied from the primary virtual volume PV, the primary and secondary virtual volumes PV and SV became equal only after transferring 5-TB of data including zero data. Therefore, even though the capacity in use in the primary virtual volume PV was 1 TB, the capacity in use in the secondary virtual volume SV became 5 TB. In particular, a large burden is put on a user who pays a charge for a system that charges the user in proportion to the capacity in use.

Figure 20:
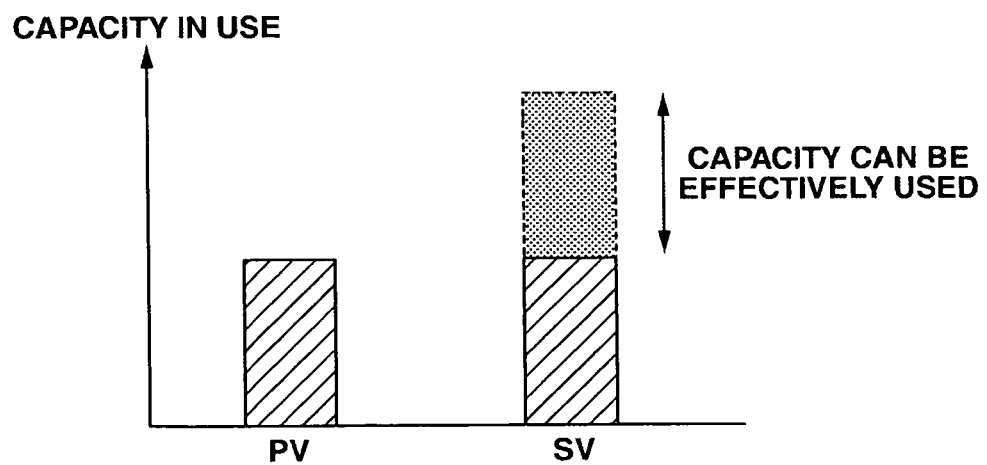
FIG. 20 is a graph illustrating the capacity in use in a virtual volume in an embodiment of the invention.

In this embodiment, when pages P in the secondary virtual volume SV are released, the capacity in use is also released. Therefore, only the original data amount of 1 TB has to be transferred from the primary virtual volume PV, and the capacity in use in the secondary virtual volume SV is only 1 TB. As a result, as shown in FIG. 20, the capacity in the secondary virtual volume SV can be effectively utilized.

Although in this embodiment data is copied or managed in units of pages, the operation may also be conducted in units of slots.

Although in the above explanation an administrator operates the pair setting processing, the page release processing and the copy processing from the management screen 80A in the storage navigator 8A, the administrator may also operate from the management screen 80B in the storage navigator 8B or the host computer 2.

Although in this embodiment page release between a secondary virtual volume and a secondary real volume was explained, the page release may also be conducted between a primary virtual volume and a primary real volume.

(5) Effect of the Invention

As described above, in this embodiment, even if, when setting a pair, a storage area in a secondary virtual volume has already been in use, the storage area in the secondary virtual volume is made available by initializing a storage area in a real volume that actually stores data in the secondary virtual volume. With that configuration, a user's cost or operation redundancy can be avoided, and the newly-redundant capacity in the secondary virtual volume can be effectively utilized.

The invention can be widely utilized in storage systems including one or more storage apparatuses, or storage systems in other modes.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage system, comprising:
a first storage apparatus including a plurality of first storage devices, a first virtual volume, and a first controller; and
a second storage apparatus including a plurality of second storage devices, a second virtual volume, and a second controller, wherein the second virtual volume includes a plurality of allocated second storage areas and the second virtual volume is currently being used by the storage system;
wherein the first controller is configured to:
provide the first virtual volume to a computer;
dynamically allocate, to the first virtual volume, one of a plurality of first storage areas in the plurality of first storage devices for storing data from the computer;
set a copy pair between the first virtual volume and the second virtual volume for copying the data, in units of storage areas, from the first storage apparatus to the second storage apparatus, wherein the second virtual volume is no longer currently being used by the storage system;
determine whether the data is stored, in units of storage areas, in the first storage area allocated to the first virtual volume;
send the data stored in the allocated first storage area from the first storage apparatus to the second storage apparatus in units of storage areas; and
issue a release instruction to the second controller to release at least one of the plurality of allocated second storage areas from the second virtual volume when the copy pair is formed; and
wherein the second controller is configured to:
release the at least one of the plurality of allocated second storage areas from the second virtual volume in response to receiving the release instruction from the first controller;
dynamically allocate the at least one released second storage area to the second virtual volume for storing another data received from the first storage apparatus; and
issue a copy commencement instruction to the first controller; and
wherein the first controller is further configured to execute the copying in response to receiving the copy commencement instruction from the second controller.

2. The storage system according to claim 1, further comprising:
storage area initialization information for managing, as an initialization target second storage area, a second storage area in the plurality of second storage devices that has had its association with the second virtual volume released; and
storage area availability information for managing, as an available second storage area, an initialized second storage area in the plurality of second storage devices.

3. The storage system according to claim 2, wherein the second controller initializes, based on the storage area initialization information, a storage area in the plurality of second storage devices that has had its association with the second virtual volume released, and registers, as an available second storage area in the storage area availability information, the initialized second storage area in the plurality of second storage devices.

4. A method for use in a storage system including a first storage apparatus having a plurality of first storage devices, a first virtual volume, and a first controller, and a second storage apparatus having a plurality of second storage devices, a second virtual volume, and a second controller, wherein the second virtual volume includes a plurality of allocated second storage areas and the second virtual volume is currently being used by the storage system, the method comprising:
providing the first virtual volume to a computer by the first controller;
dynamically allocating one of a plurality of first storage areas in the plurality of first storage devices to the first virtual volume for storing data from the computer by the first controller;
setting a copy pair by the first controller between the first virtual volume and the second virtual volume for copying the data, in units of storage areas, from the first storage apparatus to the second storage apparatus, wherein the second virtual volume is no longer currently being used by the storage system;
determining whether the data is stored, in units of storage areas, in the first storage area allocated to the first virtual volume;
sending the data stored in the allocated first storage area from the first storage apparatus to the second storage apparatus by the first controller in units of storage areas;
issuing a release instruction from the first controller to the second controller to release at least one of the plurality of allocated second storage areas from the second virtual volume when the copy pair is formed;

releasing the at least one of the plurality of allocated second storage areas by the second controller from the second virtual volume in response to receiving the release instruction from the first controller;

dynamically allocating the at least one released second storage area by the second controller to the second virtual volume for storing another data received from the first storage apparatus;

issuing a copy commencement instruction from the second controller to the first controller; and executing the copying by the first controller in response to receiving the copy commencement instruction from the second controller.

5. The method according to claim 4, further comprising:

managing, as an initialization target second storage area in storage area initialization information, a second storage area in the plurality of second storage devices that has had its association with the second virtual volume released; and managing, as an available second storage area in storage area availability information, an initialized second storage area in the plurality of second storage devices.

6. The method according to claim 5, wherein the releasing step includes:

initializing a storage area in the plurality of second storage devices that has had its association with the second virtual volume released, based on the storage area initialization information; and registering the initialized second storage area in the plurality of second storage devices as an available second storage area in the storage area availability information.

7. A secondary storage apparatus connected to a primary storage apparatus including a plurality of first storage devices, a first virtual volume, and a first controller configured to dynamically allocate one of a plurality of first storage areas in the plurality of first storage devices to the first virtual volume for storing data from a computer; set a copy pair between the first virtual volume and a second virtual volume for copying the data, in units of storage areas, from the primary storage apparatus to the secondary storage apparatus, wherein the second virtual volume is currently being used by the secondary storage apparatus until the copy pair is set; determine whether the data is stored, in units of storage areas, in the first storage area allocated to the first virtual volume; and send the data stored in the allocated first storage area from the primary storage apparatus to the secondary storage apparatus in units of storage areas, the secondary storage apparatus comprising:

a plurality of second storage devices;

the second virtual volume, including a plurality of allocated second storage areas; and a second controller, configured to:

receive a release instruction from the first controller to release at least one of the plurality of allocated second storage areas from the second virtual volume when the copy pair is formed;

release the at least one of the plurality of allocated second storage areas from the second virtual volume in response to receiving the release instruction;

dynamically allocate the at least one released second storage area to the second virtual volume for storing another data received from the primary storage apparatus; and issue a copy commencement instruction to the first controller.

8. The secondary storage apparatus according to claim 7, further comprising:

storage area initialization information for managing, as an initialization target second storage area, a second storage area in the plurality of second storage devices that has had its association with the second virtual volume released; and storage area availability information for managing, as an available second storage area, an initialized second storage area in the plurality of second storage devices.

9. The secondary storage apparatus according to claim 8, wherein the second controller initializes, based on the storage area initialization information, a storage area in the plurality of second storage devices that has had its association with the second virtual volume released, and registers, as an available second storage area in the storage area availability information, the initialized second storage area in the plurality of second storage devices.

* * * * *